(12) United States Patent
Kameda et al.

(10) Patent No.: US 6,853,095 B2
(45) Date of Patent: Feb. 8, 2005

(54) PURE WATER TANK FOR FUEL BATTERY POWER GENERATING SYSTEM

(75) Inventors: Hidenobu Kameda, Tokyo (JP); Yuichi Meguriya, Tokyo (JP); Shunichi Yamanaka, Tokyo (JP); Kazuhiro Idei, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/677,860

(22) Filed: Oct. 3, 2003

(65) Prior Publication Data
US 2004/0130160 A1 Jul. 8, 2004

(30) Foreign Application Priority Data

Oct. 4, 2002 (JP) ........................................ 2002-292440
Oct. 15, 2002 (JP) ........................................ 2002-300767

(51) Int. Cl.[7] ................................................ H20P 9/04
(52) U.S. Cl. .............................. 290/54; 290/42; 290/53
(58) Field of Search .............................. 290/54; 429/13, 429/26; 180/68.1

(56) References Cited

U.S. PATENT DOCUMENTS

2002/0043413 A1 * 4/2002 Kimishima ..................... 18/68

2004/0001982 A1 * 1/2004 Reiser .......................... 429/13
2004/0062964 A1 * 4/2004 Matsuaka ..................... 429/26

FOREIGN PATENT DOCUMENTS

JP 2000-149970 * 5/2000 ............ H01M/8/04

* cited by examiner

Primary Examiner—Nicholas Ponomarenko
Assistant Examiner—Iraj Mohandesi
(74) Attorney, Agent, or Firm—Foley & Lardner LLP

(57) ABSTRACT

A pure water tank for a fuel battery power generating system includes a tank body and a heat insulation mechanism arranged in the circumference of the tank body. By this heat insulation mechanism, the freezing of pure water in the tank body is prompted from the side of a bottom wall of the tank body. In the tank body, the growth of an ice gorge progresses from the side of the bottom wall toward a top wall of the tank body along its side walls and finally, the pure water freezes totally. Since the expansion of water due to its freezing is allowed in the upper space of tank body, the deformation of the side walls can be prevented. For promoting to thaw out the frozen water, a jacket is formed so as to extend from the bottom wall of the tank body to the side walls. A plurality of heat medium tubes may be provided to cross the interior of the tank body between an introductory side pipe of the jacket and an emissary side pipe of the jacket. Then, by introducing liquid heat medium into the jacket and the heat medium tubes, both peripheries and center of the ice gorge are firstly heated, so that the whole ice gorge can be thawed out in a short time.

12 Claims, 11 Drawing Sheets

PURE WATER TANK FOR FUEL BATTERY POWER GENERATING SYSTEM

BACKGROUND OF THE INVENTION

1. Field of the Invention

The present invention relates to a pure water tank for a fuel battery power generating system.

2. Description of Related Art

Pure water is indispensable to a fuel battery generating system in order to humidify fuel gas or oxidant gas supplied to stacks of fuel batteries. However, it should be noted that the pure water would freeze if a vehicle equipped with such a fuel battery generating system stops for a long period in a cold district.

Considering such a situation about the fuel battery generating system, Japanese Patent Application Laid-open No. 2000-149970 discloses one prior art structure where a pure water tank is provided with a spare tank around which a heater is wound. When starting the operation of the fuel battery generating system under the above-mentioned situation, the heater is energized to melt frozen water in the spare tank and subsequently, the resultant molten water in the spare tank is supplied for use.

SUMMARY OF THE INVENTION

Meanwhile, it is also noted that the pure water tank is arranged, together with other functional components, in an empty space formed under e.g. a vehicle floor. Therefore, if a vehicle stops for a long period in a cold district, the pure water in the tank begins to freeze at an upper water level in the pure water tank. Subsequently, such a freezing advances along the side wall of the tank from its upside toward the underside while an ice gorge is growing toward the underside of the tank, so that the whole tank freezes finally.

Here noted that the pure water expands due to such a freezing. When the freezing starts at the upper side of the pure water tank, the freezing has its escape cut off. Consequently, a strain is produced at the side wall and the bottom wall of the tank, so that it may be deformed.

In such a situation, it is an object of the present invention to provide a pure water tank that could prevent its body from being deformed even if the pure water freezes in the tank.

Now, we discuss the prior art structure disclosed in Japanese Patent Application Laid-open No. 2000-149970. In the process of unfreezing an ice gorge of pure water in the spare tank, the periphery of the ice gorge unfreezes relatively quickly due to the heater around the peripheral wall of the spare tank, while the center of the ice gorge unfreezes relatively slowly. Therefore, it requires a long term for the whole ice gorge to be molten. Thus, the disclosed structure cannot effect remarkable improvement in the starting ability of the fuel battery generating system.

In the above situation, it is another object of the present invention to provide a pure water tank that can shorten a thaw time of an ice gorge of pure water with simple structure thereby to accomplish the remarkable improvement in the starting ability of the fuel battery generating system.

According to the first aspect of the present invention, the above-mentioned object is accomplished by a pure water tank for a fuel battery power generating system, comprising:

a tank body having a bottom wall, side walls and a top wall, accommodating pure water; and a heat insulation mechanism arranged in the circumference of the tank body to prompt freezing of the pure water starting from the side of the bottom wall.

According to this invention, by the heat insulation mechanism, the freezing of the pure water in the tank body is prompted from the bottom wall. Then, the growth of an ice gorge in the tank body progresses from the side of the bottom wall toward the side of the surface level of the pure water along the side walls gradually. Thereafter, the whole pure water is frozen at last.

Consequently, since the expansion of the pure water at freezing is allowed in the upper space of the interior of the tank body, it is possible to avoid deformation of the side walls of the tank body due to the expansion of ice gorge.

In the pure water tank mentioned above, preferably, the heat insulation mechanism comprises a heat insulation member that is attached to the outer surface of the tank body and the thickness of the heat insulation member is established to be thin on the side of the bottom wall of the tank body while being thick on the sides of the side walls and the top wall, relatively.

According to the preferable embodiment, by adjusting the heat insulation member in thickness, it is possible to form the heat insulation mechanism as desired, with ease.

Alternatively, the heat insulation mechanism may comprise: a jacket arranged so as to extend from the bottom wall to halfway of the side walls of the tank body, the jacket having a liquid heat medium introduced thereinto; and a vacuum chamber arranged above the jacket successively so as to extend from the side walls up to the top wall of the tank body.

According to the above arrangement, due to a difference in insulation efficiency between the jacket having the liquid heat medium introduced thereinto and the vacuum chamber, it is possible to exhibit the desired function of the heat insulation mechanism sufficiently.

Additionally, by introducing the liquid heat medium into the jacket at starting the fuel battery power generating system, it is possible to shorten the thaw time of an ice gorge of the pure water in the tank body, whereby the starting ability of the system can be improved.

Alternatively, the heat insulation mechanism may comprise: a jacket arranged so as to extend from the bottom wall to halfway of the side walls of the tank body, the jacket having a liquid heat medium introduced thereinto; and a heat insulation member arranged above the jacket successively so as to extend from the side walls up to the top wall of the tank body.

According to the above arrangement, due to a difference in insulation efficiency between the jacket having the liquid heat medium introduced thereinto and the heat insulation member, it is possible to exhibit the desired function of the heat insulation mechanism sufficiently.

Additionally, by introducing the liquid heat medium into the jacket at starting the fuel battery power generating system, it is possible to shorten the thaw time of an ice gorge of the pure water in the tank body, whereby the starting ability of the system can be improved.

Preferably, the jacket on the side walls of the tank body is established so that a level of the liquid heat medium introduced into the jacket becomes higher than a top level of the pure water in the tank body at freezing.

According to the above arrangement, since the liquid heat medium is introduced into the jacket at a level higher than the top position of an ice gorge, it is possible to thaw the ice gorge from its whole periphery including the upper portion, whereby the thaw time of the ice gorge can be shortened furthermore.

Further, the tank body may be is formed so as to gradually broaden from the side of the bottom wall toward the side of the top wall.

According to the above formation of the tank body, since the allowable space for the expansion of an ice gorge is enlarged, it is possible to prevent the side walls of the tank body from being deformed due to the expansion of pure water at freezing.

According to the second aspect of the invention, there is provided a pure water tank for a fuel battery power generating system, comprising:

a tank body having a bottom wall, a peripheral side wall and a top wall;

a jacket which is formed so as to extend at least from the bottom wall to the peripheral side wall and into which a liquid heat medium is introduced, the jacket having side jackets formed in side walls of the peripheral side wall;

an introductory side header formed on the side wall to introduce the liquid heat medium into the side jackets;

an emissary side header formed on the side wall to discharge the liquid heat medium from the side jackets;

a plurality of heat medium tubes formed so as to cross the interior of the tank body and also communicate with the introductory side header and the emissary side header.

With the above-mentioned structure, by introducing the liquid heat medium into these jackets and the heat medium tubes, the ice gorge of pure water is heated from its periphery and the center portion. In addition, since the thickness of ice gorge (part) between the adjoining heat medium tubes is small relatively, the whole ice gorge can be thawed in a short time to allow the starting ability of the fuel battery power generating system to be improve remarkably.

In the above invention of the second aspect, preferably, the heat medium tubes are shaped to be flat and arranged so that their long diametral directions accord with the vertical direction of the tank body.

Owing to the formation and arrangement of the tubes, it is possible to make the thickness of each ice gorge between the adjoining flat tubes small and generally uniform, whereby the thaw of the ice gouge can be promoted.

Further, each of the heat medium tubes may be provided, at its center part in the long diametral direction, with a reinforcing rib that bridges between both side walls of the heat medium tube in the short diametral direction.

Owing to the provision of the rib, it is possible to prevent each heat medium tube from being deformed by an expanding force of the ice gorge.

In the above-mentioned invention, preferably, the pure water tank of the fuel battery power generating system further comprises a heat medium introductory pipe formed at one end of the introductory side header in the longitudinal direction and at the sectional center of the introductory side header, and a heat medium emissary pipe formed at one end of the emissary side header in the longitudinal direction and at the sectional center of the emissary side header.

Then, with the above arrangements of the heat medium introductory pipe and the heat medium emissary pipe, it is possible to distribute the liquid heat medium to the respective heat medium tubes evenly, allowing the promotion of thawing.

Further, each of the heat medium tubes may be provided, on its periphery, with fins.

Owing to the provision of the fins, the heat transmitting area of each heat medium tube is enlarged to allow the promotion of thaw furthermore.

More preferably, each of the heat medium tubes is formed to have a passage cross-sectional area or the corresponding diameter generally equal to the passage cross-sectional area or the corresponding diameter of one of other lateral side jackets in different phase of the introductory side header and the emissary side header.

According to the above arrangement, it is possible to distribute the liquid heat medium to the other side jackets and the heat medium tubes evenly, whereby the thaw performance can be improved furthermore.

Further, the tank body may be taper-shaped so as to broaden from the side of the bottom wall toward the side of the top wall.

According to the above formation of the tank body, since the allowable space for the expansion of an ice gorge is enlarged, it is possible to prevent the peripheral side wall of the tank body from being deformed due to the expansion of pure water at freezing.

More preferably, the lateral side jackets are respectively provided, at respective corners of the peripheral side wall of the tank body, with curved bendings R.

Owing to the formation of the curved bendings R, it is possible to reduce the current resistance of the lateral side jackets, allowing the liquid heat medium to flow smoothly.

These and other objects and features of the present invention will become more fully apparent from the following description and appended claims taken in conjunction with the accompany drawings.

DETAILED DESCRIPTION OF THE EMBODIMENT

Referring to the accompanying drawings, the first embodiment of the present invention will be described below.

Figure 1:
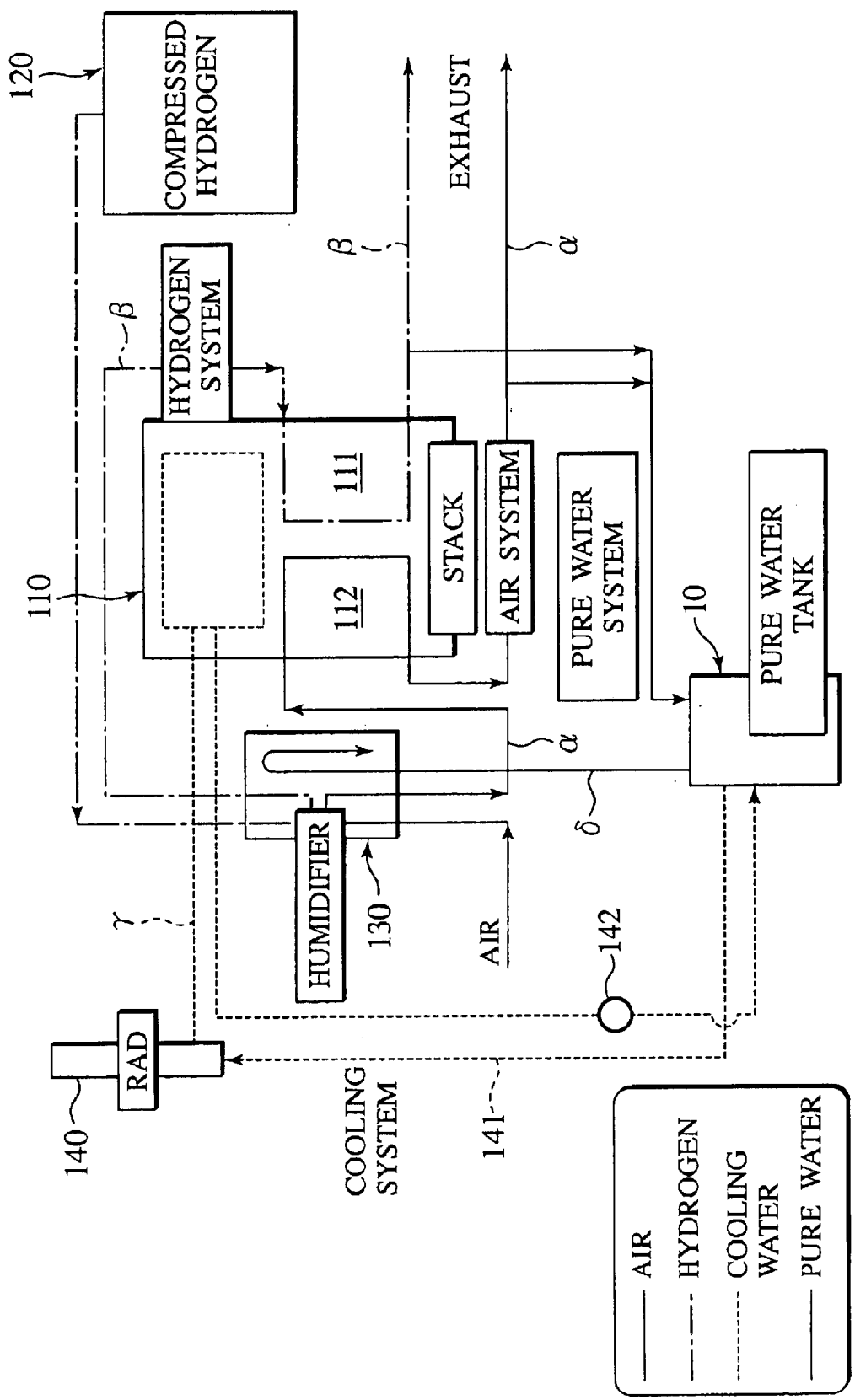
FIG. 1 is a schematic explaining view of a fuel battery power generating system using a pure water tank of the present invention.

FIG. 1 shows a fuel battery power generating system equipped with a pure water of the present invention.

In FIG. 1, a fuel battery stack 110 includes a fuel pole 111 into which pure hydrogen as fuel gas is introduced from a compressed hydrogen tank 120 and an air pole 112 into which outside air is introduced as oxidant air. The fuel battery power generating system generates electricity by making the pure hydrogen introduced into the fuel pole 111 react with oxygen introduced into the air pole 112 through a not-shown electrolyte membrane.

Both hydrogen and air supplied to the fuel battery stack 110 are humidified by a humidifier 130 in order to activate the generating action of the system and prevent deterioration of the electrolyte membrane. The humidifier 130 is supplied with pure water stored in a pure water tank 10.

The pure water for the above humidification of hydrogen and air is withdrawn by an exhaust system of the fuel battery stack 110, together with pure water resulting from the above reaction of hydrogen with air.

Since the fuel battery stack 110 becomes feverish when generating electricity, the fuel battery stack 110 is cooled down by circulatory coolant from a radiator 149. Antifreeze liquid is used as the coolant circulating between the radiator 140 and the fuel battery stack 110. According to the first embodiment, this antifreeze liquid is used as liquid heat medium for a later-mentioned jacket 22 of the pure water tank 10. The jacket 22 is interposed in a coolant route 141 connecting the fuel battery stack 110 with the radiator 140.

In the coolant route 141 connecting the fuel battery stack 110 with the radiator 140, a heater unit 142 is arranged between the fuel battery stack 110 and the jacket 22 to heat the coolant as occasion demands. This heater unit 142 may be provided by an electric heater or by utilizing fever produced by burning hydrogen discharged from the fuel battery stack 110.

In FIG. 1, thin solid lines α designate the flowing routes of air, an alternate long and short dash line β the flowing route of hydrogen, a broken line γ the flowing route of antifreeze liquid, and thick solid lines δ designate the flowing routes of pure water for humidification.

Figure 2:
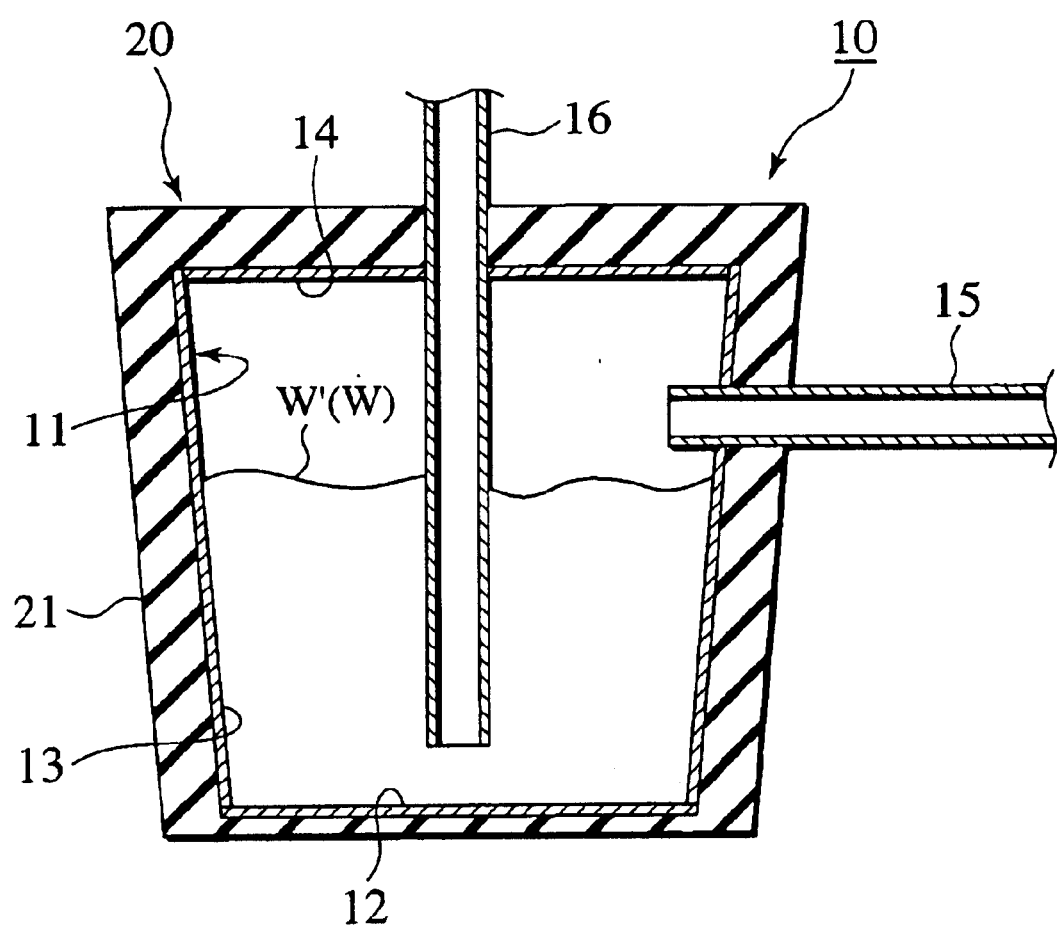
FIG. 2 is a view explaining the first embodiment of the present invention.

FIG. 2 shows the pure water tank 10 in accordance with the first embodiment of the present invention. In the pure water tank 10, a tank body 11 is rectangular-shaped to have a bottom wall 12, side walls 13 and a top wall 14.

The tank body 11 is made from stainless steel that is hard to be influenced by ion. In this embodiment, the tank body 11 is taper-shaped so as to broaden from the bottom wall 12 toward the top wall 14.

A pure water introductory pipe 15 is arranged to penetrate the upper portion of one side wall 13, while a pure water emissary pipe 16 is arranged to penetrate the top wall 14 and further arranged so that the lowermost end of the pipe 16 extends to the vicinity of the bottom wall 12.

In the circumference of the tank body 11, a heat insulation mechanism 20 is provided to prompt the freeze-up of pure water from the side of the bottom wall 12 in the course of freezing the pure water W in the tank body 11.

In this embodiment, the heat insulation mechanism 20 is formed by a heat insulation member 21 made of foaming resin, for example, foam polystyrene. In detail, the heat insulation member 21 is shaped to be thin in thickness in the vicinity of the bottom wall 12 and sufficiently thick in thickness in the vicinity of the side walls 13 and the top wall 14, producing a difference in insulation efficiency between the side of the bottom wall 12 and both sides of the side walls 13 and the top wall 14.

Figure 3A:
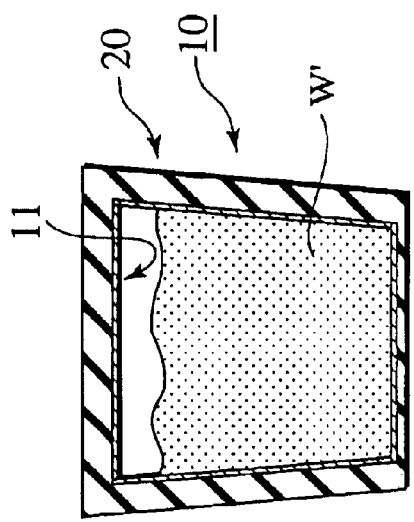
FIGS. 3A, 3B and 3C are views showing the freezing form of pure water in accordance with the first embodiment of the invention.
Figure 3B:
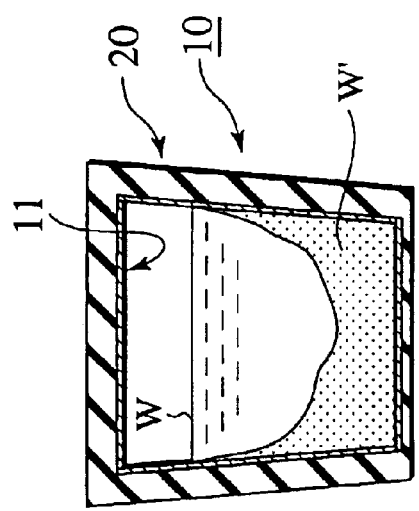
Figure 3C:
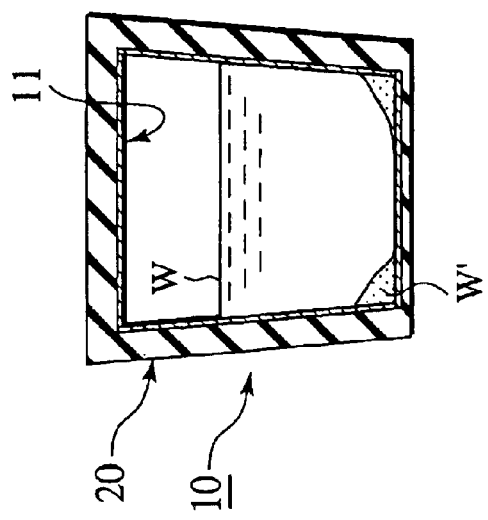

According to the above-mentioned structure of the first embodiment, since the thickness of the heat insulation member 21 is controlled so as to exhibit low insulation efficiency in the portion of the bottom wall 12 and high insulation efficiency in the portions of the side walls 13 and the top wall 14, the freezing of the pure water W, which would be caused if a vehicle stops for a long period in a cold district, is prompted from the side of the bottom wall 12 of the tank body 11, as shown in FIG. 3A. Subsequently, the growth of an ice gorge W' progresses from the bottom wall 12 to the liquid level of the pure water W through the side walls 13, as shown in FIGS. 3A and 3B. Thereafter, the pure water W is frozen totally, as shown in FIG. 3C.

Consequently, since the expansion of the pure water W is allowed in a the upper space in the tank body 11 to make free of an upsurge of the ice gorge W', it is possible to prevent the side walls 13 of the tank body 11 and even the bottom wall 12 from being deformed due to the expansion of the ice gorge W'.

Particularly, according to this embodiment, owing to the employ of the heat insulator member 21 and the thickness control of the member 21, it is possible to form the heat insulator means 20 with ease. Additionally, since the tank body 11 is taper-shaped so as to broaden from the bottom wall 12 toward the top wall 14, the allowable space for the expansion of the ice gorge W' is enlarged, whereby the deformation of the side walls 13 due to the expansion of the frozen pure water W can be prevented certainly.

Figure 4:
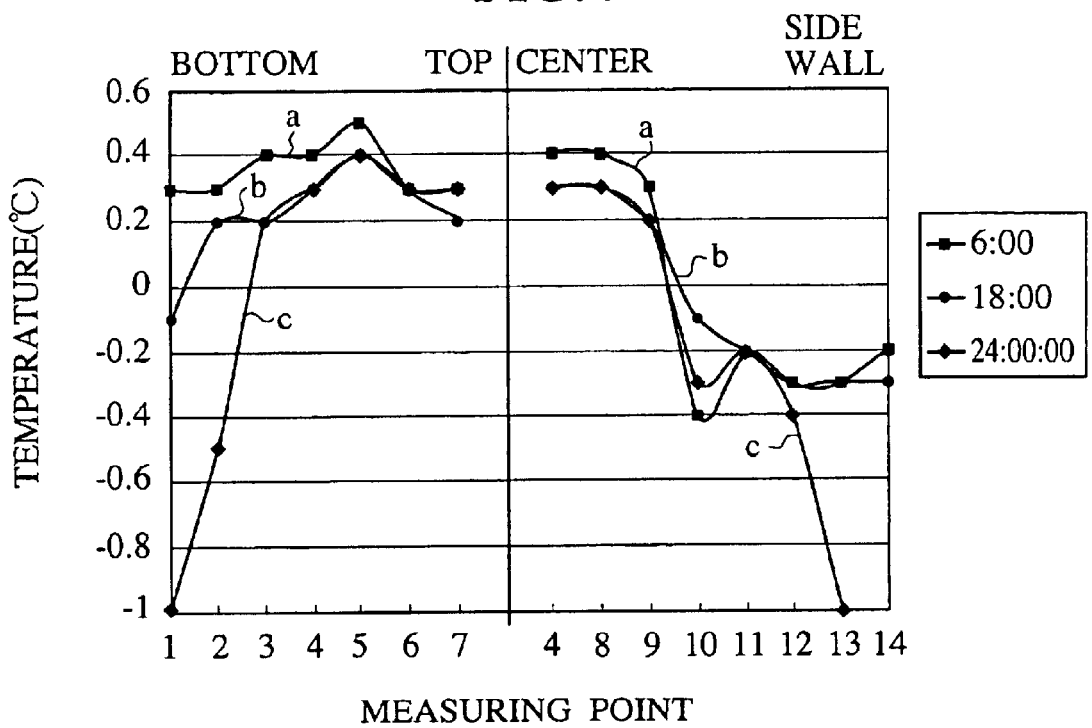
FIG. 4 is a temperature graph showing the freezing of pure water along a model in accordance with the first embodiment of the invention.

FIG. 4 is a graph showing the result of freezing test for pure water in the pure water tank 10.

Figure 6:
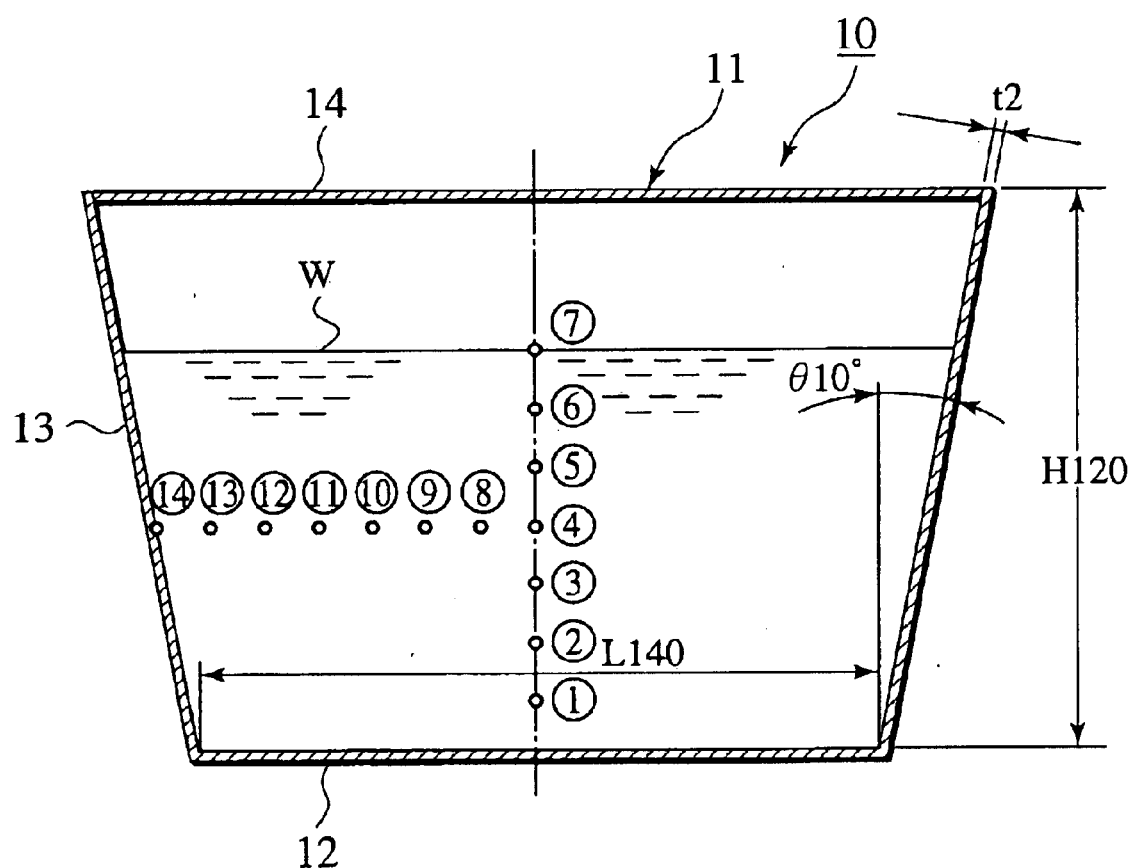
FIG. 6 is a sectional view showing the model of the first embodiment of the invention.

In the pure water tank 10 of FIG. 6, all of the bottom wall 12, the side walls 13 and the top wall 14 are made from SUS304 stainless steel plate having its thickness t=2 mm. The tank body 11 measuring H=120 mm in height, L=140 mm in length each side of the bottom wall 12 and θ=10° in taper angle of the side walls 13, is formed to be square in plan view. Foaming polystyrene plates of 12 mm in thickness as the heat insulator member are put on the side walls 13 and the top wall 14, while no insulator member is put on the bottom wall 12. Noted that the heat insulator member is not illustrated in FIG. 6.

The pure water W is poured into the so-constructed pure water tank 10 up to a level near the top wall 14. Then, the tank 10 filled with the water W is arranged in a natural circulation type freezer of −20° in temperature inside. FIG. 4 is a graph showing respective temperature changes over time at respective positions ① to ⑭ in the pure water W.

Numeral marks ① to ⑦ denote temperature-measuring positions obtained by dividing a distance from the bottom wall 12 to the liquid level at the tank center equally among seven in the vertical direction, while other marks ⑧ to ⑭ denote temperature-measuring positions obtained by dividing a distance from the intermediate position ④ of the liquid level to one side wall 13 equally among seven in the horizontal direction.

In FIG. 4, lines a, b and c designate respective temperature changes at the positions ① to ⑭ after 6 hours elapse, 18 hours elapse and 24 hours elapse, respectively.

As obvious from the graph, in the vertical direction of the tank body 11, the pure water W begins to freeze from the side of the bottom wall 12 and the liquid level freezes at last. In the horizontal direction, the freezing of the pure water progresses from the side of the side wall 13 toward the tank center.

Figure 5:
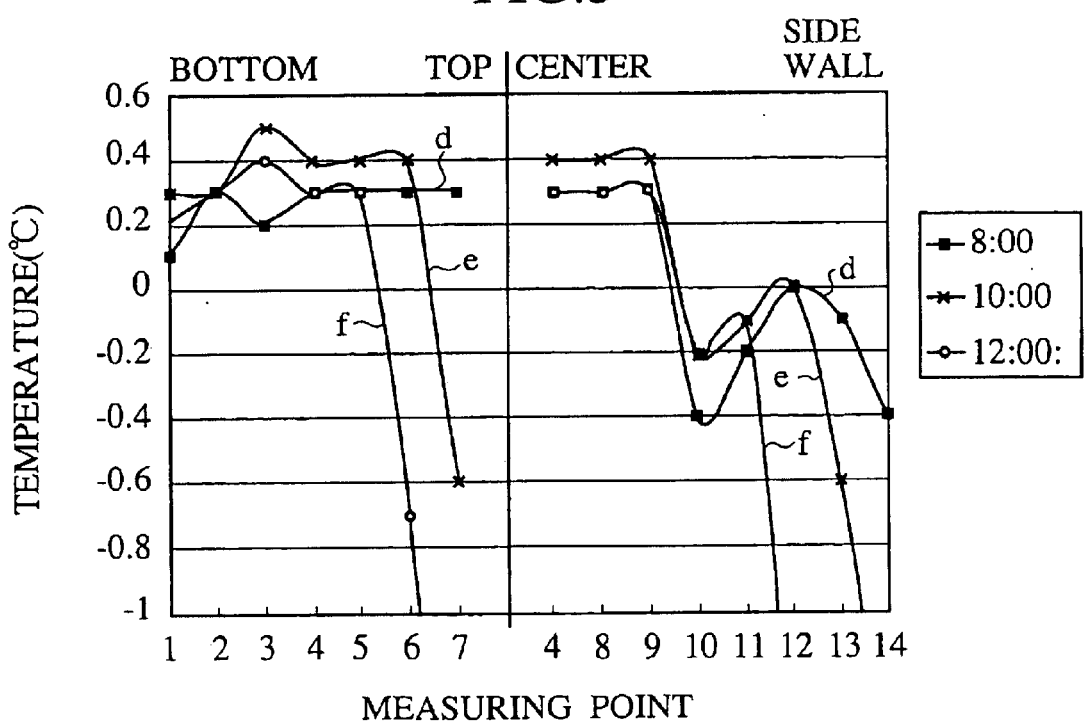
FIG. 5 is a temperature graph showing the freezing of pure water along a comparative example with the model in accordance with the first embodiment of the invention.

As an comparative example, the top wall 14 is removed from the tank body 11 shown in FIG. 6. With no provision of the heat insulator member on the periphery of the tank body 11, freezing test was performed under the same test conditions as above (re. the same liquid level, measuring position and temperature inside). FIG. 5 is a graph showing the result of the comparative freezing test.

In FIG. 5, lines d, e and f designate respective temperature changes at the positions ① to ⑭ after 8 hours elapse, 10 hours elapse and 12 hours elapse, respectively.

In this comparative example, it will be understood from the graph that the pure water W begins to freeze from the side of the liquid level and the side of the bottom wall 12 freezes at last in the vertical direction, while the freezing of the pure water progresses from the side of the side wall 13 toward the tank center in the horizontal direction.

Figure 7:
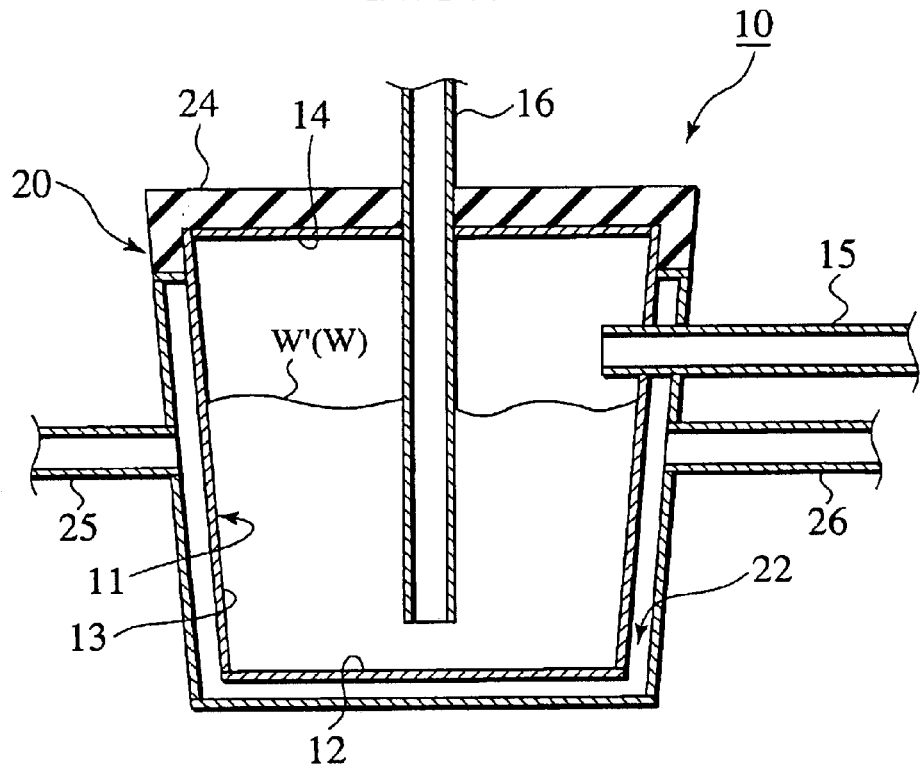
FIG. 7 is a sectional explaining view showing the second embodiment of the present invention.

FIG. 7 shows the second embodiment of the present invention. According to the second embodiment, the jacket 22 containing liquid heat medium therein is formed so as to extend from the bottom wall 12 of the tank body 11 toward the halfway of the side walls 13. Additionally, on the top of the jacket 22, a heat insulation member 24 similar to the previous member 21 is arranged so as to extend from the side walls 13 to the top wall 14. That is, the above-mentioned heat insulation mechanism 20 is formed by the jacket 22 and the heat insulation member 24 in this embodiment.

The jacket 22 is communicated with the coolant route 141 of FIG. 1 through a liquid heat medium introductory pipe 25 and a liquid heat medium emissary pipe 26, allowing the antifreeze liquid returning from the fuel battery stack 110 to the radiator 140 to be introduced into the jacket 22.

Further, according to the embodiment, the jacket 22 on the side walls 13 of the tank body 11 is established so that the level of liquid heat medium introduced into the jacket 22 is higher than the level of the pure water in the body 11 at freezing.

Therefore, according to the structure of the second embodiment, since the difference in insulation efficiency between the jacket 22 having the liquid heat medium and the heat insulation member 24 allows the insulation efficiency on the side of the upper space in the tank body 11 to be enhanced, it is possible to bring out the function of the heat insulation mechanism 20 sufficiently, allowing the freezing of pure water in the tank body 11 from the side of the bottom wall 12, as similar to the first embodiment.

Additionally, when the liquid heat medium is introduced into the jacket 22 at the start of the fuel battery power generating system, the thaw time of the ice gorge W' in the tank body 11 can be shortened to improve the starting capability of the same system.

Particularly, since the liquid heat medium is introduced into the jacket 22 upward of the top of the ice gorge W', it is possible to unfreeze the ice gorge W' from its whole periphery including the top portion, whereby the thaw time can be shortened.

Figure 8:
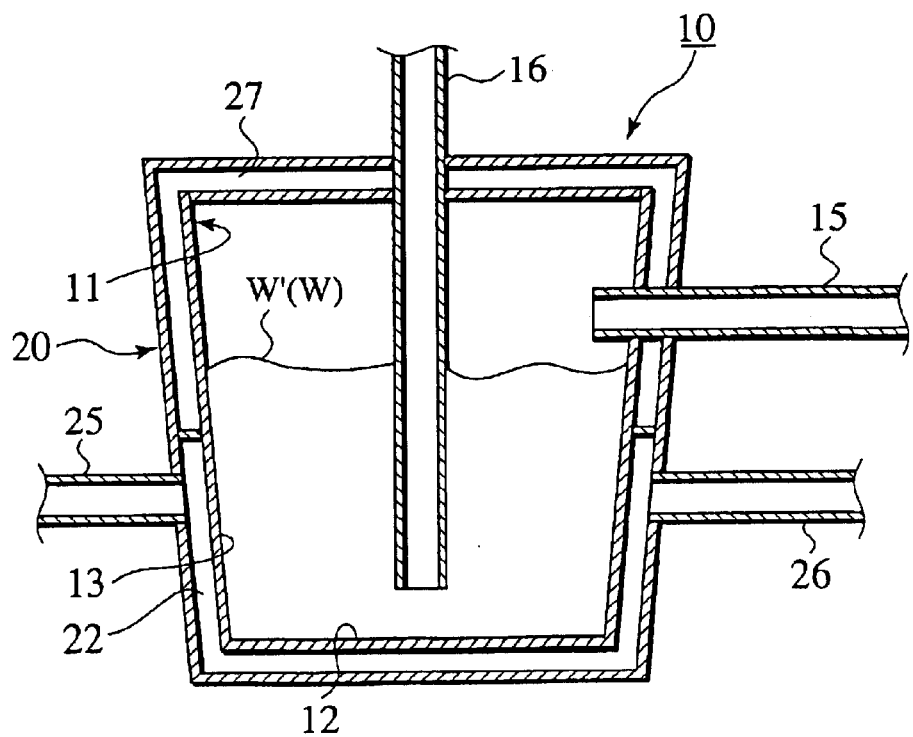
FIG. 8 is a sectional explaining view showing the third embodiment of the present invention.

FIG. 8 shows the third embodiment of the present invention. There is no difference between the third embodiment and the second embodiment in view that the jacket 22 containing liquid heat medium therein is formed so as to extend from the bottom wall 12 of the tank body 11 toward the halfway of the side walls 13. However, the third embodiment differs from the second embodiment in that a vacuum chamber 27 is defined above the jacket 22 so as to extent the side walls 13 of the body 11 to the top wall 14, thereby providing the heat insulation mechanism 11 by the jacket 11 and the vacuum chamber 27.

In order to enhance the insulation efficiency of the upper side of the tank body 11, the end of the vacuum chamber 27 at the side walls 13 is lowered in comparison with the liquid level of pure water in the tank body 11. Noted that in the figure, the chamber end is lower than the top of the ice gorge W'. Alternatively, as similar to the second embodiment, the jacket 22 may be formed so that the jacket end at the side walls 13 is higher than the top of the ice gorge W'.

Therefore, also in the third embodiment, since the difference in insulation efficiency between the jacket 22 having the liquid heat medium and the vacuum chamber 27 of high insulation efficiency allows the insulation efficiency on the side of the upper space in the tank body 11 to be enhanced, it is possible to bring out the function of the heat insulation mechanism 20 sufficiently, allowing the freezing of pure water in the tank body 11 from the side of the bottom wall 12, as similar to the first embodiment. Additionally, when the liquid heat medium is introduced into the jacket 22 at the start of the fuel battery power generating system, the thaw time of the ice gorge W' in the tank body 11 can be shortened to improve the starting capability of the same system.

Figure 9:
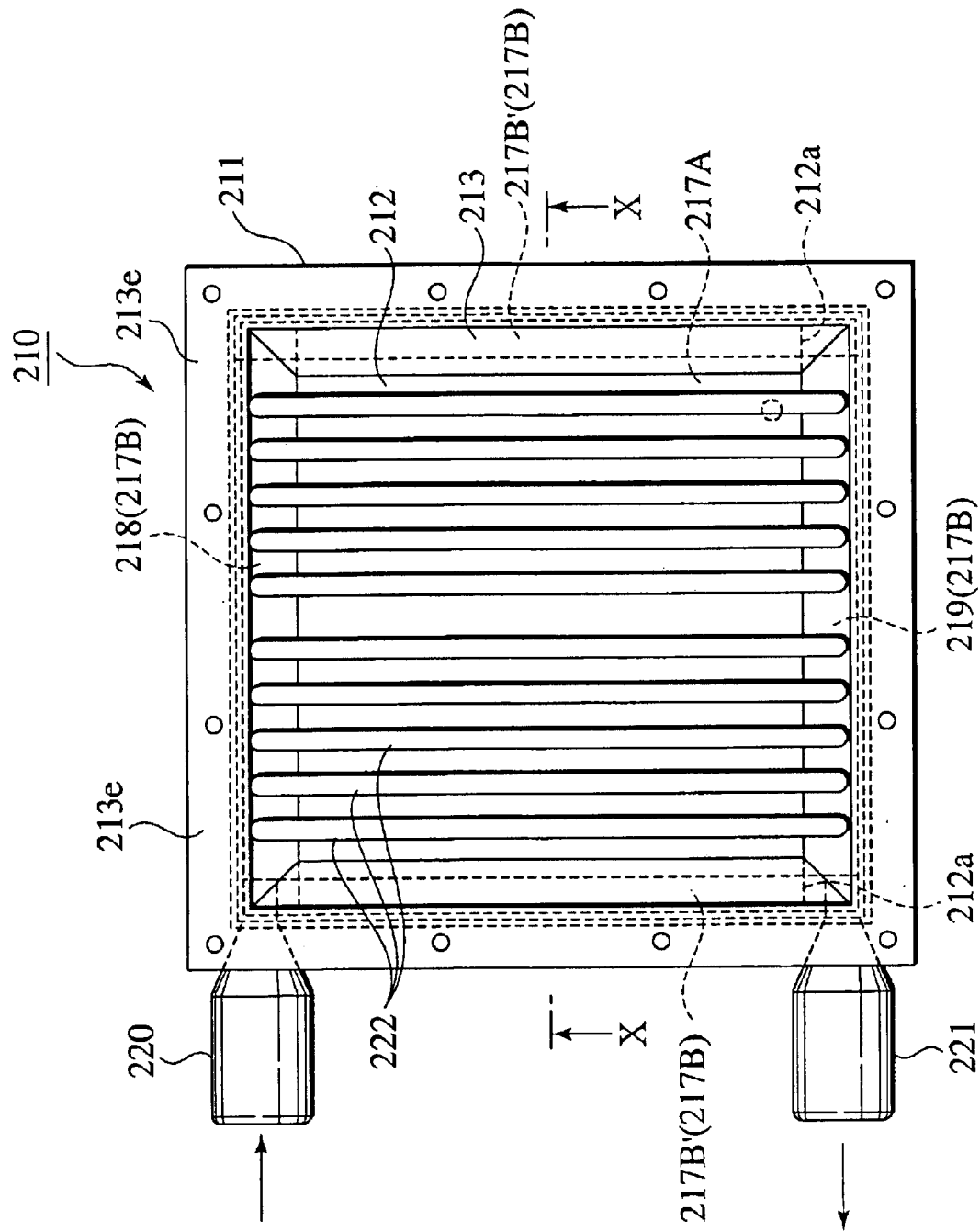
FIG. 9 is a plan view showing the fourth embodiment of the present invention.
Figure 10:
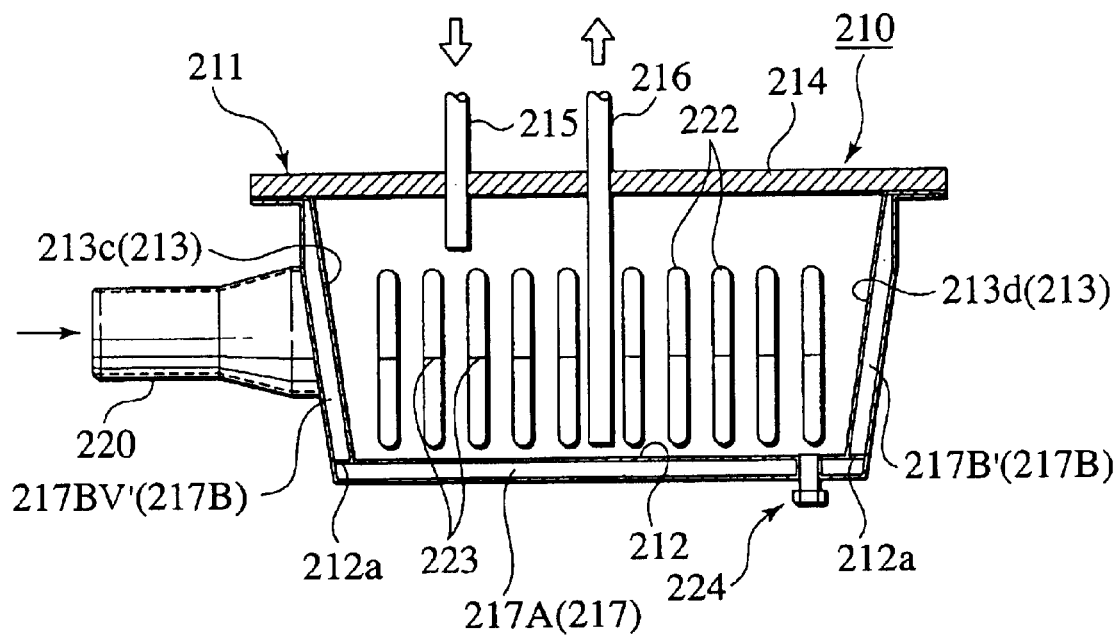
FIG. 10 is a sectional view taken along a line X—X of FIG. 9.
Figure 11:
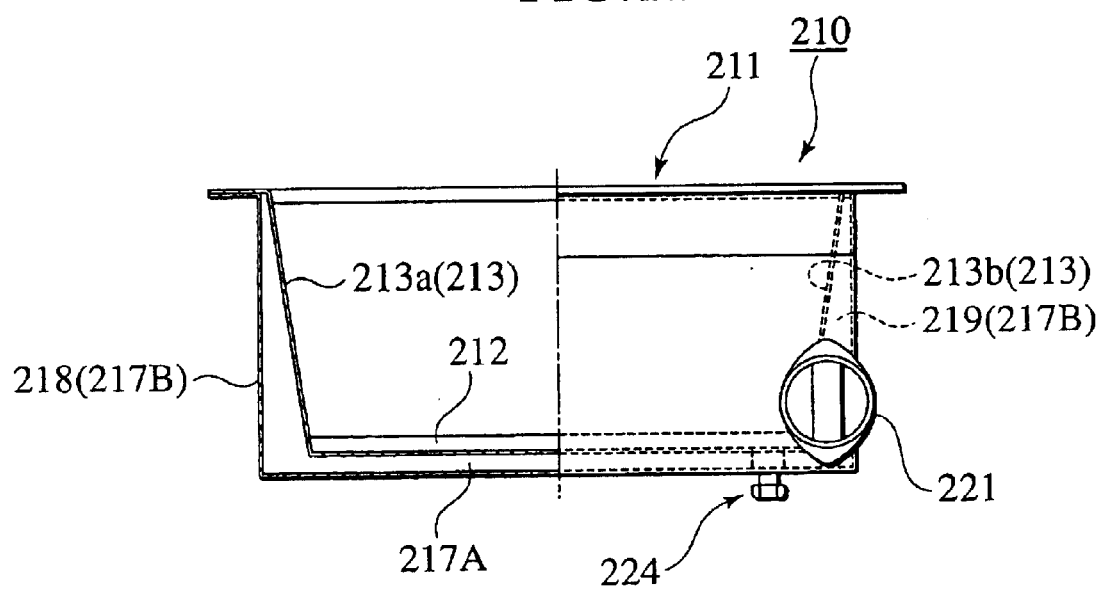
FIG. 11 is a semi-sectional view of FIG. 9, viewed from its left side.

FIGS. 9 to 11 each show a pure water tank 210 in accordance with the fourth embodiment of the invention. In the pure water tank 210, a tank body 211 is rectangular-shaped to have a bottom wall 212, a peripheral side wall 213 and a top wall 214.

The top wall 214 is secured on an upper flange 213e of the peripheral side wall 213 by fastening means, such as bolt and nut. FIGS. 9 and 11 each show a condition where the top wall 214 is detached from the tank 210.

The tank body 211 is made from stainless steel that is hard to be influenced by ion. In this embodiment, the tank body 11 is taper-shaped so as to broaden from the bottom wall 212 toward the top wall 214.

A pure water introductory pipe 215 and a pure water emissary pipe 216 are arranged to penetrate the top wall 214. Again, the pure water emissary pipe 216 is arranged so that the lowermost end of the pipe 316 extends to the vicinity of the bottom wall 212.

A jacket 217 having liquid heat medium introduced thereinto is formed so as to extend from the bottom wall 212 of the tank body 211 toward the peripheral side wall 213.

In side jackets 217B, 217B of opposing side walls 213a, 213b in pairs forming the peripheral side wall 213, one side jacket 217B forms an introductory side header 218 into which the liquid heat medium is introduced through a heat medium introductory pipe 220, while the other side jacket 217B forms an emissary side header 219 from which the liquid heat medium is discharged through a heat medium emissary pipe 221. In the tank body 211, a plurality of heat medium tubes 222 are arranged so as to cross the interior of the tank body 211. Spanning between the header 218 and the header 219, the heat medium tubes 222 are communicated with each other.

The heat medium tubes 222 are formed to be flat respectively. While aligning their long diametral direction with the vertical direction of the tank body 211, the heat medium tubes 222 are paralleled each other at regular intervals in the vicinity of the bottom wall 212.

Each heat medium tube 222 is provided, at the center of the long diameter, with a reinforcing rib 223 extending between opposing side walls in the short diametral direction of the tube 222.

The heat medium introductory pipe 220 and the heat medium emissary pipe 221 are arranged on the longitudinal ends of the introductory side header 218 and the emissary side header 219, respectively, and also arranged at substantial intermediate positions of the sections of the headers 218, 219.

In the side jackets 217B, opposing side jackets 217B' each intersecting with the headers 218, 219 at right angles are separated from a bottom jacket 217A through an extension 212a of the bottom wall 212. Being substantially paralleled with the side walls 213c, 213d, these side jackets 217B' are formed with relatively narrow gaps, having sectional areas smaller than those of the headers 218, 219.

The heat medium tube 222 is established to have its passage area or the corresponding diameter D (note: D=4S/L, S: sectional area, L: peripheral length) generally equal to that of the side jacket 217B'.

The above jacket 217 is communicated with the coolant route 141 through the heat medium introductory pipe 220 and the heat medium emissary pipe 221, allowing the antifreeze liquid returning from the fuel battery stack 110 to the radiator 140 to be introduced into the jacket 217.

The side jackets 217B are each established so that the level of liquid heat medium introduced thereinto is higher than the level of the pure water in the body 211 at freezing.

In FIGS. 10 and 11, reference numeral 224 designates a drain part for draining the pure water from the tank body 211.

Again noted that if a vehicle stops for a long period in a cold district, the pure water in the pure water pump 210 is frozen to ice gorge. However, according to the structure of the fourth embodiment, at the start of the fuel battery power generating system, a not-shown water pump in the cooling system of the radiator 140 is driven to circulate the antifreeze liquid (after heat exchange at the fuel battery stack 110) in the jacket 217. Then, the antifreeze liquid circulates through the side jackets 217B, the bottom jacket 217A and the heat medium tubes 222, thereby carrying out the heat exchange against the whole ice gorge (including its periphery, bottom and center) in the tank body 211. As a result, it is possible to thaw the whole ice gorge in a short time, whereby the starting capability of the fuel battery power generating system can be improved remarkably.

If fever generated from the fuel battery stack 110 cannot thaw out the ice gorge in the pure water tank 210 within a predetermined period, the heater unit 142 between the fuel battery stack 110 in the cooling system and the jacket 217 of the pure water tank 210 heats the above antifreeze liquid, so that the starting capability of the fuel battery power generating system can be improved.

According to this embodiment, since the thickness of the ice gorge can be reduced and equalized generally owing to the provision of the adjoining flat heat medium tubes 22, it is possible to prompt the thawing-out of the ice gorge.

Additionally, since the heat medium introductory pipe 220 and the emissary pipe 221 are together positioned at the substantial centers of the introductory side header 218 and the emissary side header 219 of the side jackets 217B, the liquid heat medium can be distributed to the heat medium tubes 222 equally. Further, since the side jackets 217B' in parallel with the heat medium tubes 222 each have a cross section generally equal to that of the tube 222, the liquid heat medium can be distributed to the side jacket 217B and the heat medium tube 222 equally. For these reasons, the thaw performance can be enhanced in the embodiment.

Furthermore, in spite of flatness of the heat medium tubes 222, the provision of the reinforcing ribs 223 therein enables prevention of the tubes 222 from being deformed by expanding force of the ice gorge.

Again, since the tank body 211 broaden toward the upside portion allows the allowable space for the expansion of the ice gorge to be enlarged, it is also possible to prevent the peripheral wall 213 of the tank body 211 from being deformed due to the expansion of the frozen water.

Figure 12:
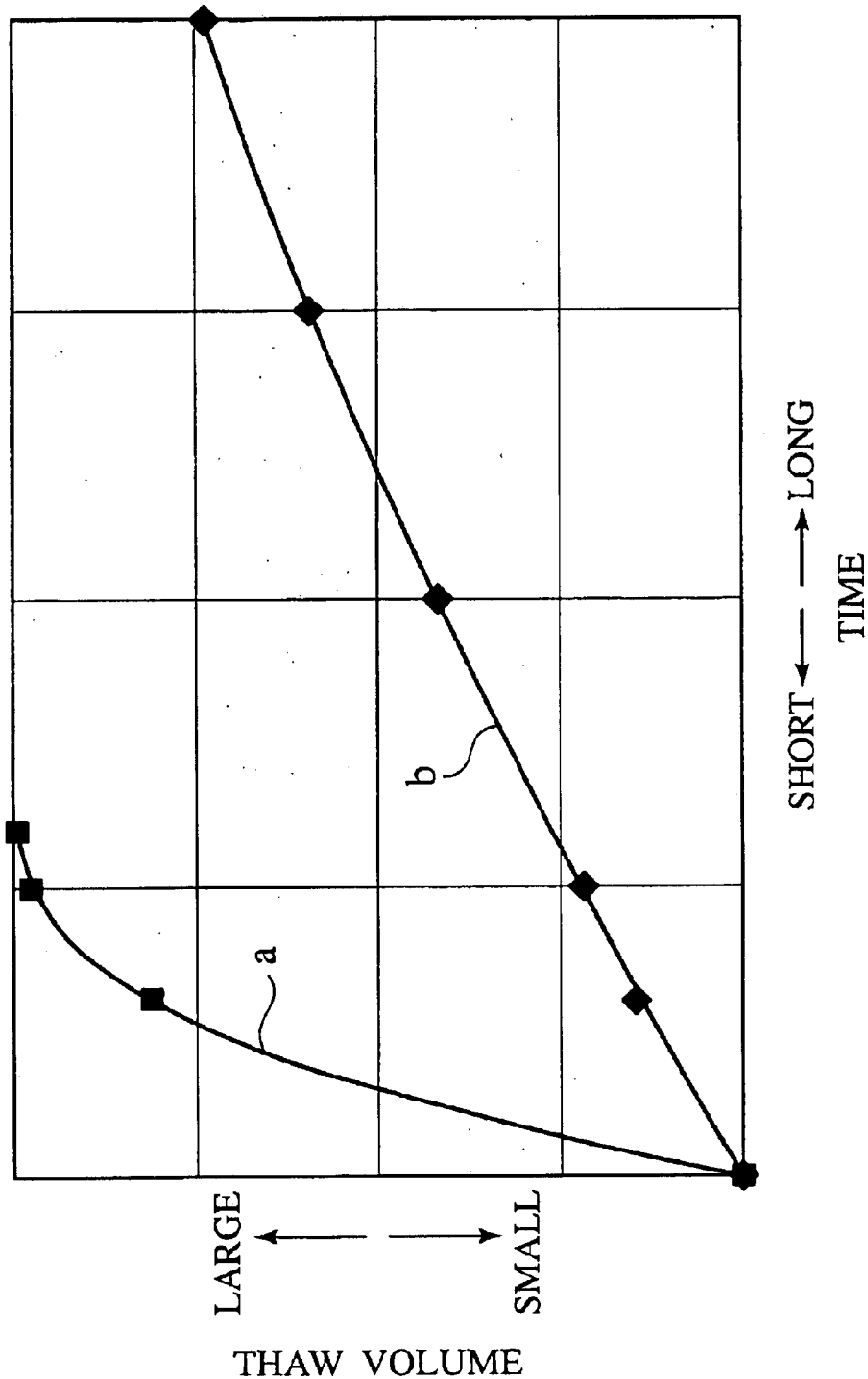
FIG. 12 is a graph explaining the unfreezing ability of the fourth embodiment of the present invention in comparison with a comparative example.
Figure 13:
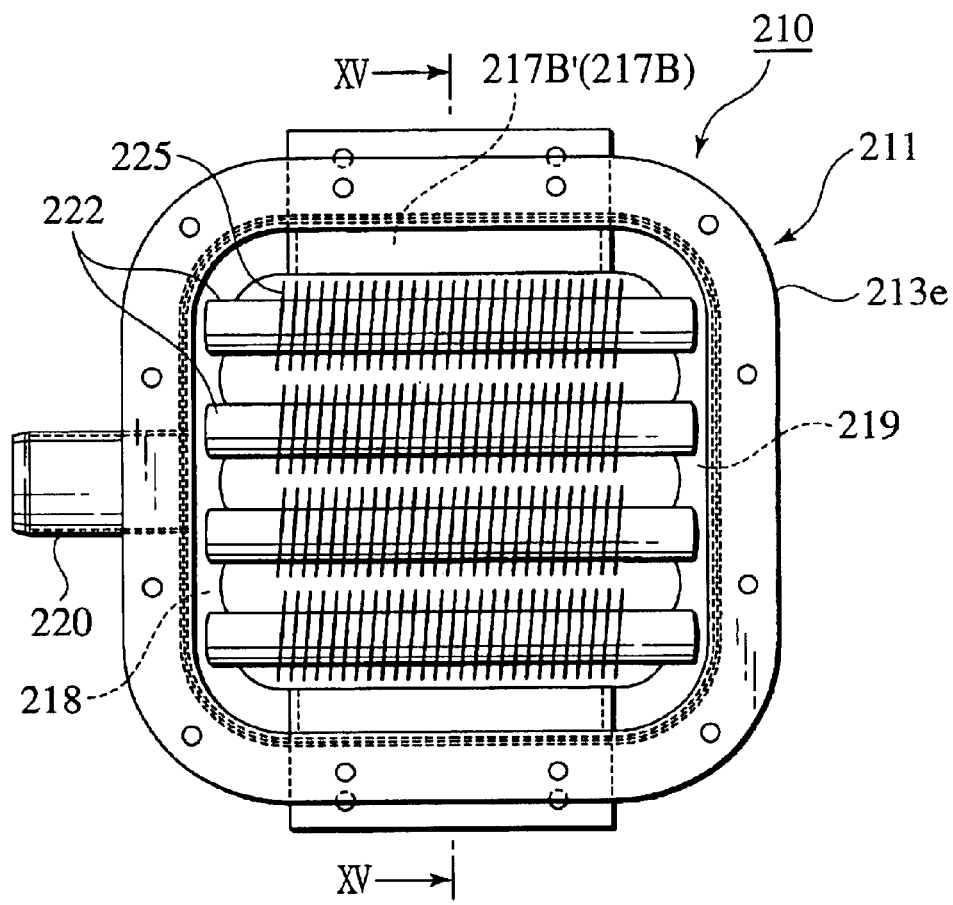
FIG. 13 is a plan view showing the fifth embodiment of the present invention.
Figure 14:
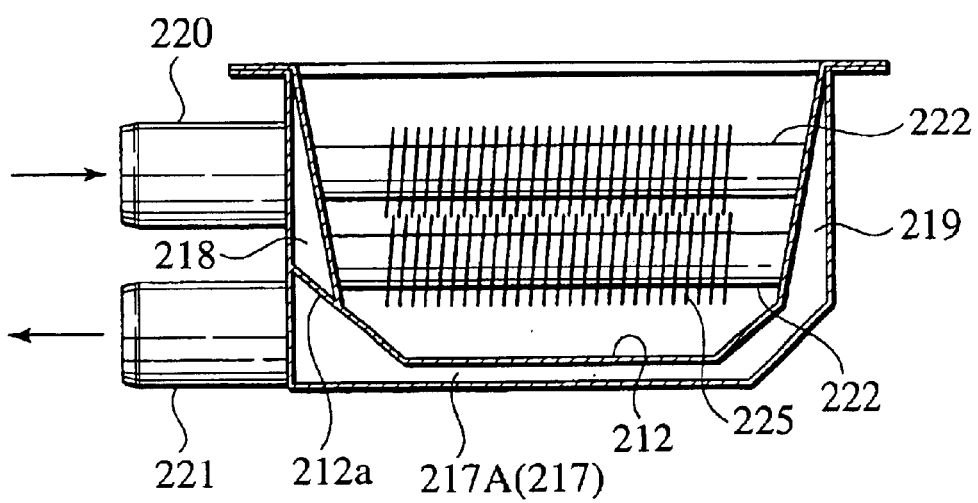
FIG. 14 is a side view of FIG. 13.
Figure 15:
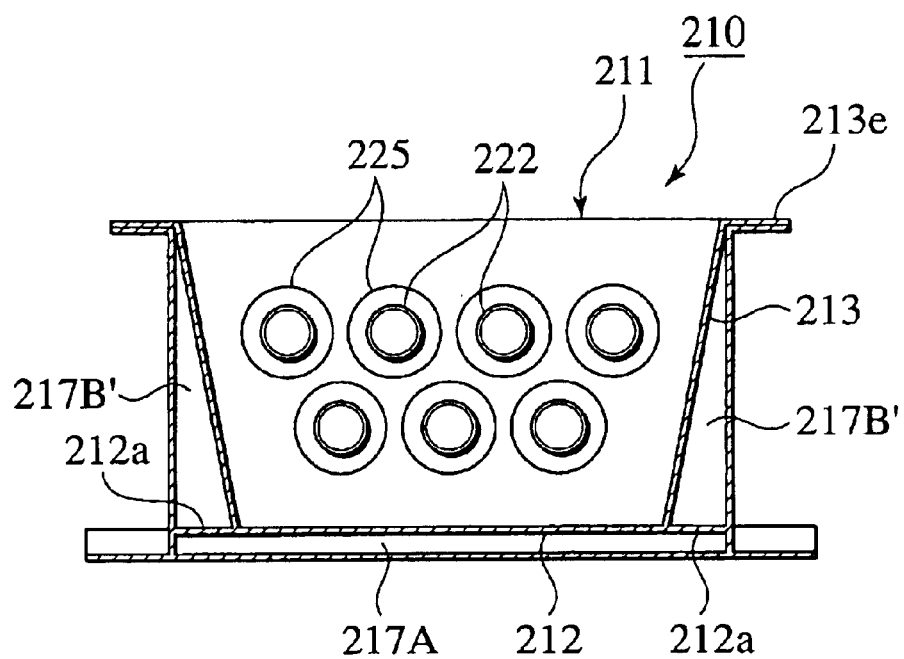
FIG. 15 is a sectional view taken along a line XV—XV of FIG. 13.
Figure 16:
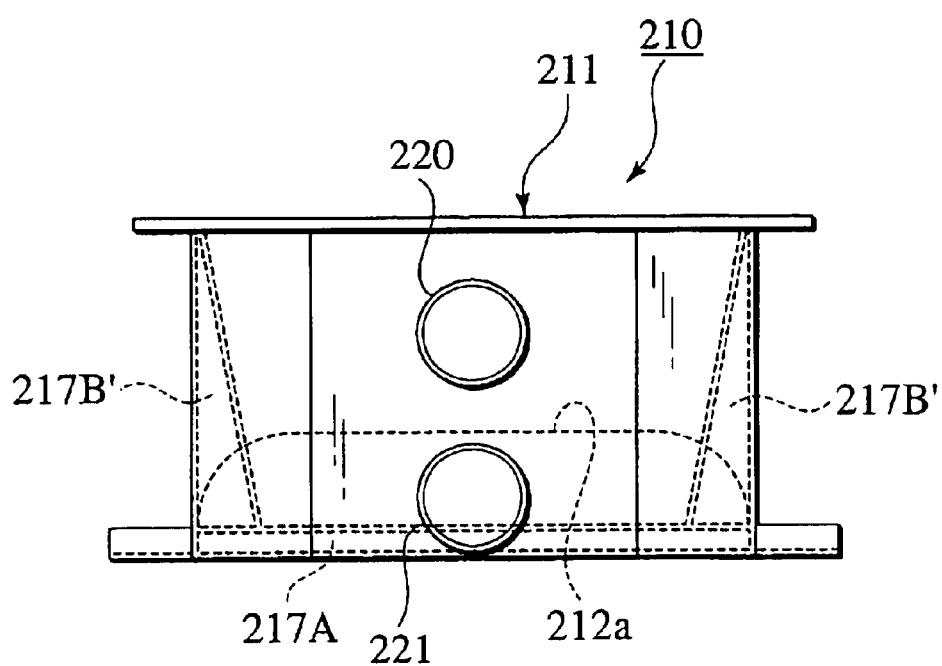
FIG. 16 is a side view of FIG. 13, viewed from its left side.

FIG. 12 is a graph showing the thaw performance of the pure water tank 210 of the fourth embodiment and a comparative structure where no heat medium tube 222 is provided but the jacket 217 only. In the figure, line a designates the thaw performance of this embodiment, while line b designates the thaw performance of the comparative example. From the graph, it will be understood that the structure of the embodiment can exhibit remarkably-high thaw performance shown with the line a due to the heating action of both the jacket 217 and the heat medium tubes 222 in comparison with the performance of the comparative structure shown with the line b.

FIGS. 13 to 16 show the fifth embodiment of the present invention. According to the fifth embodiment, the introductory side header 218 and the side jackets 217B', 217B' of the jacket 217 are perfectly separated from the bottom jacket 217A through the extension 212a of the bottom wall 212, while the bottom jacket 217A is communicated with the emissary side header 219.

The bottom jacket 217A is formed, on the underside of the introductory side header 218, so as to enlarge upwardly. The heat medium introductory pipe 220 is arranged at the center of the introductory side header 218 in the width direction. Below the heat medium introductory pipe 220, the heat medium emissary pipe 221 is arranged in such an enlarged part of the bottom jacket 217A.

The heat medium tubes 222 are circular shaped and arranged in multistage in the vertical direction.

The heat medium tubes 222 on the lower stage are each positioned to be between the heat medium tubes 222, 222 on the upper stage in plan view. Each heat medium tube 222 is provided, on its periphery, with fins 225.

At each corner of the peripheral wall 213 of the tank body 211, the side jacket 217 is rounded with a predetermined curvature radius thereby providing a curved bending R.

In the fifth embodiment, the liquid heat medium introduced from the heat medium introductory pipe 220 is distributed, at the introductory side header 218, to a plurality of heat medium tubes 222 substantially equally and also the side jackets 217B', 217B'. Continuously, the liquid heat medium flowing in the heat medium tubes 222 and the side jackets 217B', 217B' is gathered at the emissary side header 219 and into the bottom jacket 217A. Then, the liquid heat medium is discharged from the bottom jacket 217A out of the jacket 217 through the heat medium emissary pipe 221.

Therefore, since the similar unfreezing to the fourth embodiment is prompted, it is possible to improve the starting capability of the fuel battery power generating system in the fifth embodiment.

Further, since the heat medium tubes 222 each have the fins 225 on the periphery in this embodiment, the heat transmission area of the heat medium tubes 222 can be increased to enhance an effect to prompt the unfreezing of the central portion of the ice gorge.

Additionally, owing to the provision of the above bending R at each corner of the side jacket 217B, the air-flow resistance of the side jacket 217B is reduced, whereby it is possible to perform the circulation of the liquid heat medium smoothly.

Finally, it will be understood by those skilled in the art that the foregoing descriptions are nothing but some embodiments of the disclosed pure water tank for the fuel battery power generating system. Besides these embodiments, various changes and modifications may be made to the present invention without departing from the spirit and scope of the invention.

This application claims priority from Japanese Patent Application 2002-292440, filed Oct. 4, 2002, and Japanese Patent Application 2002-300767, file Oct. 15, 2002, both of which are incorporated herein by reference in their entirety.

What is claimed is:

1. A pure water tank for a fuel battery cower generating system, comprising:
    a tank body having a bottom wall, side wall and a top wall, accommodating pure water; and
    a heat insulation mechanism arranged in the circumference of the tank body to prompt freezing of the pure water starting from the side of the bottom wall,
    wherein the heat insulation mechanism comprises:
        a jacket arranged so as to extend from the bottom wall to halfway of the side walls of the tank body, the jacket having a liquid heat medium introduced thereinto; and
        a vacuum chamber arranged above the jacket successively so as to extend from the side walls up to the top wall of the tank body.

2. A pure water tank for a fuel battery power generating system comprising:
    a tank body having a bottom wall, side walls and a top wall, accommodating pure water; and
    a heat insulation mechanism arranged in the circumference of the tank body to prompt freezing of the pure water starting from the side of the bottom wall,
    wherein the heat insulation mechanism comprises:
        a jacket arranged so as to extend from the bottom wall to halfway of the side walls of the tank body, the jacket having a liquid heat medium introduced thereinto; and
        a heat insulation member arranged above the jacket successively so as to extend from the side walls up to the top wall of the tank body.

3. The pure water tank of the fuel battery power generating system of claim 1, wherein the jacket on the side walls of the tank body is established so that a level of the liquid heat medium introduced into the jacket becomes higher than a top level of the pure water in the tank body at freezing.

4. The pure water tank of the fuel battery power generating system of claim 1, wherein the tank body is formed so as to gradually broaden from the side of the bottom wall toward the side of the top all.

5. A pure water tank for a fuel battery power generating system, comprising:
    a tank body having a bottom wall, a peripheral side wall and a top wall;
    a jacket which is formed so as to extend at least from the bottom wall to the peripheral side wall and into which a liquid heat medium is introduced, the jacket having side jackets formed in side walls of the peripheral side wall;
    an introductory side header formed on the side wall to introduce the liquid heat medium into the side jackets;
    an emissary side header formed on the side wall to discharge the liquid heat medium from the side jackets;
    a plurality of heat medium tubes formed so as to cross the interior of the tank body and also communicate with the introductory side header and the emissary side header.

6. The pure water tank of the fuel battery power generating system of claim 5, wherein the heat medium tubes are shaped to be flat and arranged so that their long diametral directions accord with the vertical direction of the tank body.

7. The pure water tank of the fuel battery power generating system of claim 6, wherein each of the heat medium tubes is provided, at its center part in the long diametral direction, with a reinforcing rib that bridges between both side walls of the heat medium tube in the short diametral direction.

8. The pure water tank of the fuel battery power generating system of claim 5, further comprising a heat medium introductory pipe formed at one end of the introductory side header in the longitudinal direction and at the sectional center of the introductory side header, and a heat medium emissary pipe formed at one end of the emissary side header in the longitudinal direction and at the sectional center of the emissary side header.

9. The pure water tank of the fuel battery power generating system of claim 5, wherein each of the heat medium tubes is provided, on its periphery, with fins.

10. The pure water tank of the fuel battery power generating system of claim 5, wherein each of the heat medium tubes is formed to have a passage cross-sectional area or the corresponding diameter substantially equal to the passage cross-sectional area or the corresponding diameter of one of other side jackets in different phase of the introductory side header and the emissary side header.

11. The pure water tank of the fuel battery power generating system of claim 5 wherein the tank body is taper-shaped so as to broaden from the side of the bottom wall toward the side of the top wall.

12. The pure water tank of the fuel battery power generating system of claim 5, wherein the side jackets are respectively provided, at respective corners of the peripheral wall of the tank body, with a curved structure.

* * * * *